(12) United States Patent
Nakamura et al.

(10) Patent No.: US 12,172,917 B2
(45) Date of Patent: Dec. 24, 2024

(54) PURE-WATER PRODUCTION DEVICE AND PURE-WATER PRODUCTION METHOD

(71) Applicant: ORGANO CORPORATION, Tokyo (JP)

(72) Inventors: Yuki Nakamura, Tokyo (JP); Kazushige Takahashi, Tokyo (JP); Keisuke Sasaki, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 421 days.

(21) Appl. No.: 17/437,975

(22) PCT Filed: Feb. 13, 2020

(86) PCT No.: PCT/JP2020/005550
§ 371 (c)(1),
(2) Date: Sep. 10, 2021

(87) PCT Pub. No.: WO2020/184044
PCT Pub. Date: Sep. 17, 2020

(65) Prior Publication Data
US 2022/0177340 A1 Jun. 9, 2022

(30) Foreign Application Priority Data
Mar. 13, 2019 (JP) .................................. 2019-045327

(51) Int. Cl.
*B01D 61/02* (2006.01)
*B01D 61/08* (2006.01)
(Continued)

(52) U.S. Cl.
CPC .............. *C02F 9/00* (2013.01); *B01D 61/025* (2013.01); *B01D 61/026* (2022.08); *B01D 61/08* (2013.01);
(Continued)

(58) Field of Classification Search
CPC .............................. B01D 61/025; B01D 61/48; B01D 2317/025; C02F 1/441; C02F 1/4695; C02F 2301/046; C02F 2301/066
See application file for complete search history.

(56) References Cited

U.S. PATENT DOCUMENTS 5,238,574 A 8/1993 Kawashima et al.
2016/0159671 A1 6/2016 Ikuno

FOREIGN PATENT DOCUMENTS

| CN | 105392552 A | 3/1993 |
| CN | 207596652 U | * 7/2018 |

(Continued)

OTHER PUBLICATIONS

Chen Z—CN-207596652-U machine translation—Jul. 10, 2018 (Year: 2018).*

(Continued)

*Primary Examiner* — Bradley R Spies
(74) *Attorney, Agent, or Firm* — GREENBLUM & BERNSTEIN, P.L.C.

(57) ABSTRACT

A pure-water production device including: a first reverse osmosis membrane device to which water to be treated is supplied; a second reverse osmosis membrane device to which permeated water from the first reverse osmosis membrane device is supplied; an electrodeionization device to which permeated water from the second reverse osmosis membrane device is supplied; a brine tank to which concentrated water from the first reverse osmosis membrane device is supplied; and a third reverse osmosis membrane device connected to the brine tank, wherein the second reverse osmosis membrane device is a high-pressure reverse osmosis membrane device, the brine tank is supplied with at least one concentrated water selected from the group consisting of concentrated water from the second reverse osmosis membrane device and concentrated water from the (Continued)

electrodeionization device, wherein permeated water from the third reverse osmosis membrane device is supplied to water to be treated, is used.

7 Claims, 4 Drawing Sheets

(51) Int. Cl.
*B01D 61/48* (2006.01)
*B01D 61/58* (2006.01)
*C02F 1/44* (2023.01)
*C02F 1/66* (2023.01)
*C02F 9/00* (2023.01)
*C02F 1/469* (2023.01)
*C02F 101/10* (2006.01)

(52) U.S. Cl.
CPC ............. *B01D 61/48* (2013.01); *B01D 61/58* (2013.01); *B01D 2311/18* (2013.01); *B01D 2311/2523* (2022.08); *B01D 2317/025* (2013.01); *C02F 1/441* (2013.01); *C02F 1/4695* (2013.01); *C02F 1/66* (2013.01); *C02F 2101/10* (2013.01); *C02F 2301/046* (2013.01); *C02F 2301/066* (2013.01); *C02F 2301/08* (2013.01)

(56) References Cited

FOREIGN PATENT DOCUMENTS

| | | |
|---|---|---|
| JP | 4-150923 A | 5/1992 |
| JP | 2004-000919 A | 1/2004 |
| JP | 2004-167423 A | 6/2004 |
| JP | 2005-246281 A | 9/2005 |
| JP | 2015-20131 A | 2/2015 |
| JP | 2016-117001 A | 6/2016 |
| JP | 2016-150275 A | 8/2016 |
| WO | 2015/012054 A1 | 1/2015 |
| WO | WO-2016033319 A1 * | 3/2016 ........... B01D 61/445 |

OTHER PUBLICATIONS

Yamada S et al—JP 2004-000919 A FIT translation—Jan. 8, 2004 (Year: 2004).*
Niki T—JP 2004-167423 A FIT translation—Jun. 17, 2004 (Year: 2004).*
Ikuno N—WO 2015/012054 A1 FIT translation—Jan. 29, 2015 (Year: 2015).*
International Search Report issued in International Patent Application No. PCT/JP2020/005550, dated Apr. 21, 2020, along with English translation thereof.
Written Opinion of the International Searching Authority issued in International Patent Application No. PCT/JP2020/005550, dated Apr. 21, 2020, along with English translation thereof.

* cited by examiner

PURE-WATER PRODUCTION DEVICE AND PURE-WATER PRODUCTION METHOD

TECHNICAL FIELD

The present invention relates to a pure-water production device and a pure-water production method.

TECHNICAL BACKGROUND

As an application such as cleaning water in a manufacturing process of a semiconductor device or a manufacturing process of a liquid crystal device, ultrapure water in which an organic substance, an ion component, a fine particle, a bacterium, or the like is highly removed has been used. The ultrapure water production device is composed of a primary pure water system (pure-water production device) and a subsystem. As the pure-water production device, a combination system (RO-EDI system) of a reverse osmosis (RO) membrane device and an electrodeionization (EDI) device is widely used. An ultra-low-pressure to low-pressure reverse osmosis membranes are often used as RO for pure water production.

On the other hand, with the miniaturization of semiconductor line width, the required water qualities of pure water and ultrapure water used for cleaning have been increased, and for example, reduction of boron has been demanded as a trace amount of impurities. For this reason, for the purpose of reducing the boron concentration, a method has been proposed in which a high-pressure reverse osmosis membrane and an ion exchange device as conventionally used in desalination applications of seawater are combined (Patent Document 1 and Patent Document 2).

Further, in order to improve the quality of the permeated water of the RO device, it has been proposed that the permeated water of the RO device in a first stage is treated by the RO device in a second stage or later by using plural stages of low-pressure RO devices, and the obtained permeated water is supplied to an EDI device (Patent Document 3). In this case, since the concentration of impurities in the concentrated water discharged from the RO device in the second stage or later is lower than that of the feed water (water to be treated) supplied to the RO device in the first stage, it is possible to increase a water recovery rate of the entire system while diluting the water to be treated by returning (mixing) the concentrated water from the RO device in the second stage to the water to be treated. In addition, for the same reason, the concentrated water discharged from the EDI device is also returned to the water to be treated.

Further, in order to increase the water recovery rate, the concentrated water of the RO device in the first stage is passed through a third RO device as the water to be treated, and the obtained permeated water is returned to the water to be treated.

PRIOR-ART DOCUMENT

Patent Document

[Patent Document 1] JP-A-2015-20131
[Patent Document 2] JP-A-2016-117001
[Patent Document 3] JP-A-2004-167423

SUMMARY OF THE INVENTION

Problems to be Solved by the Invention

Here, when boron removal is intended, it is considered that a high-pressure RO device having higher boron removal performance than the RO device in the first stage is used as the RO device in the second stage. The low-pressure RO has a low rejection rate of boron, and in the case where the RO device of the first stage is the low-pressure RO, there is a concern that boron that has not been completely removed in the RO device of the first stage is concentrated in the RO device of the second stage, and the concentration of boron in the concentrated water becomes higher than that of the water to be treated. When water having a higher impurity concentration than the water to be treated is returned to the water to be treated, a concentration effect is exerted on the water to be treated, and the impurity concentration in the system gradually increases, resulting in a problem that the treated water quality of RO-EDI system decreases.

Means for Solving the Problems

The present inventors have found that the above-mentioned problem is solved by making at least one stage in the second stage or later a high-pressure RO in a plural-stage RO-EDI system, and by returning permeated water, which has been further RO-treated with concentrated water of the high-pressure RO, to the water to be treated.

That is, the present invention is a pure-water production device comprising a first reverse osmosis membrane device to which the water to be treated is supplied, a second reverse osmosis membrane device to which permeated water from the first reverse osmosis membrane device is supplied, an electrodeionization device to which permeated water from the second reverse osmosis membrane device is supplied, a brine tank to which the concentrated water from the first reverse osmosis membrane device is supplied, a third reverse osmosis membrane device connected to the brine tank, wherein the second reverse osmosis membrane device is a high-pressure reverse osmosis membrane device, the brine tank is supplied with at least one concentrated water selected from the group consisting of concentrated water from the second reverse osmosis membrane device and concentrated water from the electrodeionization device, wherein permeated water from the third reverse osmosis membrane device is supplied to the water to be treated.

Further, the present invention is a pure-water production method, including: (a) a step of supplying water to be treated to a first reverse osmosis membrane device, (b) a step of supplying permeated water from the first reverse osmosis membrane device to a second reverse osmosis membrane device, (c) a step of supplying permeated water from the second reverse osmosis membrane device to an electrodeionization device, (d) a step of supplying concentrated water from the first reverse osmosis membrane device to a brine tank, (e) a step of supplying to the brine tank at least one concentrated water selected from the group consisting of concentrated water from the second reverse osmosis membrane device and concentrated water from the electro deionization device, (f) a step of supplying the concentrated water in the brine tank to a third reverse osmosis membrane device, (g) a step of supplying permeated water from the third reverse osmosis membrane device to the water to be treated, and (h) a step of taking out treated water from the electrodeionization device as pure water, wherein the second reverse osmosis membrane device is a high-pressure reverse osmosis membrane device.

Effect of Invention

In a pure-water production device having a plurality of RO-EDI systems, pure water with reduced boron can be produced without lowering the water recovery rate.

DETAILED DESCRIPTION OF THE PRESENT INVENTION

Figure 1:
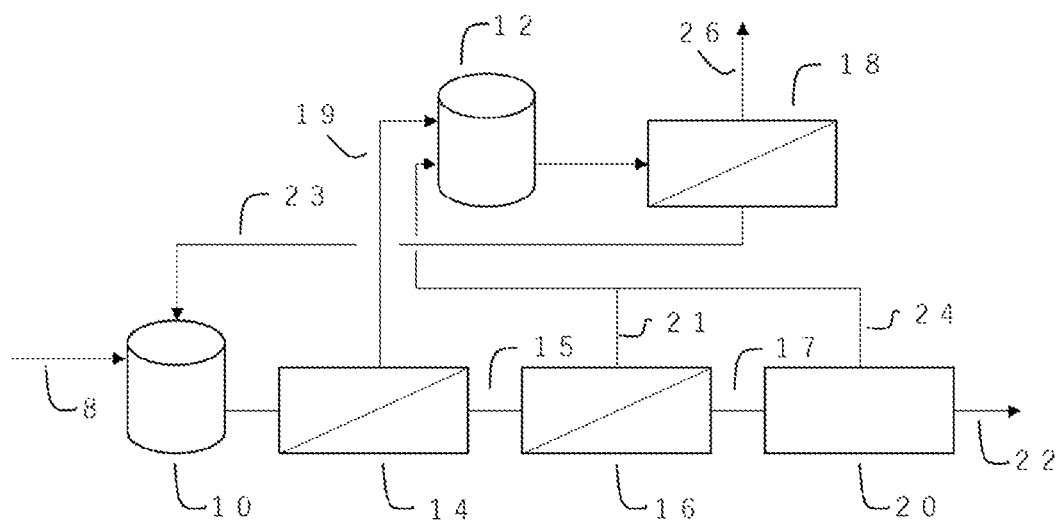
FIG. 1 A schematic diagram showing the configuration of a pure water production device according to an embodiment of the present invention.

First, a first embodiment in a pure water production device according to the present invention will be described with reference to FIG. 1. In FIG. 1, water to be treated 8 is supplied from a tank 10 of water to be treated to a first reverse osmosis membrane device 14 by a pump (not shown), permeated water 15 from the first reverse osmosis membrane device 14 is supplied to a second reverse osmosis membrane device 16 by a pump (not shown), and permeated water 17 from the second reverse osmosis membrane device 16 is supplied to an electrodeionization device (EDI) 20 by a pump (not shown). Concentrated water 19 from the first reverse osmosis membrane device 14, concentrated water 21 from the second reverse osmosis membrane device 16, and concentrated water 24 from EDI 20 are supplied to the brine tank 12, and these concentrated waters are supplied from the brine tank 12 to a third reverse osmosis membrane device 18 by pumps (not shown). Permeated water 23 from the third reverse osmosis membrane device 18 is collected in the tank 10 of water to be treated, and concentrated water 26 is discharged as a blow. The first reverse osmosis membrane device 14 is an ultra-low pressure to low pressure reverse osmosis membrane device, and the second reverse osmosis membrane device 16 is a high-pressure reverse osmosis membrane device.

The first embodiment of the pure-water production device according to the present invention is configured as described above, and the operation thereof will be described below.

The water to be treated 8 supplied to the tank 10 of water to be treated is supplied to the first reverse osmosis membrane device 14 of a low-pressure type to an ultra-low-pressure type, the permeated water 15 is supplied to the second reverse osmosis membrane device 16 of a high-pressure type, and the permeated water 17 is further supplied to EDI 20, and finally the treated water 22 is produced as pure water. Since the low-pressure type to ultra-low-pressure type RO has a low rejection of boron and urea, boron and urea are contained in the permeated water of the first reverse osmosis membrane device 14. On the other hand, since the high-pressure RO has a higher rejection of boron and urea than the low-pressure to ultra-low-pressure RO, boron and urea are effectively removed in the second reverse osmosis membrane device. The concentrated water 19 from the first reverse osmosis membrane device 14, the concentrated water 21 from the second reverse osmosis membrane device 16 and the concentrated water 24 from EDI 20 are supplied to the brine tank 12. Then, these concentrated waters are supplied to the third reverse osmosis membrane device 18, and the permeated water 23 thereof is collected in the tank 10 of water to be treated. Here, since the concentrated water 21 from the second reverse osmosis membrane device 16 and the concentrated water 24 from EDI 20 have a lower impurity concentration than the concentrated water 19 from the first reverse osmosis membrane device 14, the concentrated water 19 from the first reverse osmosis membrane device 14 can be diluted in the brine tank 12.

As the membrane used in the low-pressure reverse osmosis device used in the present invention, a low-pressure membrane or an ultra-low-pressure membrane capable of operating at a relatively low pressure is preferably used. As the low-pressure membrane and the ultra-low-pressure membrane, those having a pure water flux of 0.65 to 1.8 m/d, preferably 0.65 to 1.0 m/d at an effective pressure 1 MPa and a water temperature of 25° C. can be used.

Here, the flux is obtained by dividing the permeated water amount by the reverse osmosis membrane surface area. "Effective pressure" is an effective pressure exerted on the membrane, which is obtained by subtracting the osmotic pressure difference and secondary side pressure from the average operating pressure as described in JIS K3802:2015 "Technical terms". The average operating pressure is an average value of the pressure of the membrane supply water (operating pressure) and the pressure of the concentrated water (concentrated water outlet pressure) on the primary side of the reverse osmosis membrane, and is expressed by the following equation.

Average operating pressure=(operating pressure+
concentrated water outlet pressure)/2

The permeation flux per 1 MPa of the effective pressures can be calculated from the data described in the membrane manufacturer's catalogues, e.g., permeate volume, membrane area, recovery rate at the time of assessment, NaCl concentrations, etc. When a plurality of reverse osmosis membranes having the same permeation flux are loaded in one or a plurality of pressure vessels, the permeation flux of the loaded membranes can be calculated from information such as the average operating pressure/secondary side pressure of the pressure vessels, the quality of water to be treated, the amount of permeated water, and the number of membranes.

Low-pressure to ultra-low-pressure type reverse osmosis membranes include, for example, ES series manufactured by NITTO (ES15-D8, ES20-U8, trade name), HYDRANAUTICS made ESPA series (ESPAB, ESPA2, ESPA2-LD-MAX, trade name) and CPA series (CPA5-MAX, CPA7-LD, trade name), Toray made TMG series (TMG20-400, TMG20D-440 trade name) and TM700 series (TM720-440, TM720D-440, trade name), Dow Chemical Co. made BW series (BW30HR, BW30XFR-400/34i), SG series (SG30LE-440, SG30-400), and FORTILIFE CR100.

In the present invention, it is used a high-pressure type reverse osmosis membrane device as the second reverse osmosis membrane device. The high-pressure reverse osmosis membrane device has been developed for desalination of seawater, but it is possible to remove ions, TOC, and the like efficiently by a lower operating pressure with respect to the water to be treated having a low salt concentration. For example, it is also possible to realize the processing capacity of two stages of ultra-low-pressure to low-pressure type reverse osmosis membrane device in one stage if it is a high-pressure type reverse osmosis membrane device. By using such a reverse osmosis membrane device, it is possible to dramatically increase the rejection of undissociated substances such as silica, boron, urea, ethanol, and isopropyl alcohol, which cannot be sufficiently removed by an ultra-low-pressure to low-pressure membrane. The third reverse osmosis membrane device may be of a low-pressure type or a high-pressure type, but is preferably of a high-pressure type. By making the third reverse osmosis membrane device into a high-pressure type reverse osmosis device, the water quality of the permeated water 23 from the third reverse osmosis membrane device is improved, and the dilution effect of the water to be treated can be enhanced. As a result, the EDI treated water is improved.

In the present invention, as a definition of a "high-pressure type" used in a second reverse osmosis membrane device, there may be mentioned roughly those which exhibit the following properties. That is, the pure water flux at 1 MPa of the effective pressure and at a water temperature of 25° C. is 0.2 to 0.65 m/d. The effective pressure of the high-pressure reverse osmosis membrane is preferably 1.5 to 2.0 MPa. By setting the effective pressure to be equal to or higher than 1.5 MPa value, the boron rejection of the high-pressure reverse osmosis membrane can be sufficiently increased. Further, by setting the effective pressure to be equal to or higher than 2.0 MPa value, an effect of further improving the boron rejection can be expected, but since the durable pressure of the device needs to be increased, the facility cost may be increased.

Examples of the high-pressure reverse osmosis membrane include SWC Series (SWC4, SWC5, SWC6) (trade name) manufactured by HYDRANAUTICS Corporation, TM800 Series (TM820V, TM820M) (trade name) manufactured by Toray Corporation, and SW Series (SW30HRLE, SW30ULE) (trade name) manufactured by Dow Chemical Corporation.

Next, the reverse osmosis membrane device according to the present invention will be described. The reverse osmosis membrane device is composed of a reverse osmosis membrane module composed of members such as a reverse osmosis membrane and a flow path member, and one or more pressure vessels (simply vessel) loaded with one or more of the reverse osmosis membrane modules. By pumping the water to be treated into the vessel loaded with the membrane module, a quantity of permeate corresponding to the effective pressure is obtained from the vessel. Also, water that does not permeate through the membrane module and is concentrated in the vessel is discharged from the vessel as concentrated water. The shape of the reverse osmosis membrane module is not particularly limited, and a tubular type, a spiral type, or a hollow fiber type module can be used. When multiple reverse osmosis membrane modules are used in the same vessel, each reverse osmosis membrane module is connected in series. When multiple vessels are used in a reverse osmosis device, the vessels can be placed in parallel or in series. For example, the pumped water to be treated can be supplied to a plurality of vessels installed in parallel, and the permeated water and the concentrated water of each vessel can be merged and discharged from the device. Furthermore, the concentrated water discharged from each vessel can be supplied to another vessel in a vessel configuration such as a so-called Christmas tree system.

The module configuration and vessel configuration of these reverse osmosis membrane devices can be appropriately designed and selected according to the required quality and quantity of the permeated water, water recovery rate, footprint, and the like.

The water recovery rate of each of the reverse osmosis membrane device used in the present invention is calculated by the ratio of the water to be treated of each of the reverse osmosis membrane devices and the permeated water obtained by each of the reverse osmosis membrane devices. That is, the recovery rate of each reverse osmosis membrane device=(the amount of permeate obtained by each reverse osmosis membrane device)/(the amount of water to be treated supplied to each reverse osmosis membrane device). Appropriate water recovery rates can be designed and selected depending on the quality of water to be treated, the required quality and quantity of the permeated water, the required water recovery rate, the required footprint, and the like. Without particular limitation, the recovery rate of the first reverse osmosis device is 50 to 90%, preferably 65 to 85%, the recovery rate of the second reverse osmosis membrane device is 80 to 99%, preferably 85 to 95%, and the recovery rate of the third reverse osmosis membrane device is 40 to 85%, preferably 60 to 80%. In particular, in the water recovery rate of the second reverse osmosis membrane, since the impurity concentration is lowered by the first reverse osmosis membrane treatment, a high value can be set.

In addition, in the first and second and third reverse osmosis membrane devices, chemicals (e.g., a reducing agent, a pH adjusting agent, a scale dispersant, a fungicide, and the like) used in a general reverse osmosis membrane device can be used.

Next, the EDI used in the present invention will be described. The EDI is a device having a desalting chamber partitioned by an ion exchange membrane and filled with an ion exchanger, a concentrating chamber for concentrating ions demineralized in the desalting chamber, and an anode and a cathode for energizing an electric current, and is a device for simultaneously performing deionization (desalting) treatment of water to be treated by an ion exchanger and regeneration treatment of the ion exchanger by energizing an electric current. The water to be treated passed through the EDI is desalted by an ion exchanger filled in the desalting chamber and discharged to the outside of the EDI as the EDI treatment water. Similarly, concentrated water in which ions are concentrated is discharged to the outside as EDI concentrated water.

The recovery rate of EDI is calculated based on the amount of water to be treated supplied to EDI and the amount of treated water obtained. That is, the EDI recovery rate=(amount of EDI-treated water)/(amount of water to be treated supplied to EDI). Although there is no particular limitation on the EDI recovery rate, it is preferably 90 to 95%

The recovery rate of RO-EDI systems is calculated by the ratio between the amount of water to be treated and the amount of treated water obtained by EDI. That is, the recovery rate of RO-EDI systems is the amount of EDI-treated water/the amount of water to be treated. Th amount of water to be treated here refers to the flow amount before the permeated water from the third reverse osmosis device merges. Although there is no particular limitation on the water recovery rate of the present RO-EDI system, it is 80 to 99%, preferably 85 to 95%. In this system, it is possible to satisfy both high system recovery rate and water recovery rate because concentration in the system is not applied while recovering concentrated water of the second reverse osmosis device and EDI concentrated water.

By performing post-treatment on the EDI-treated water, the quality of the permeated water obtained in the RO-EDI systems can be further improved. The post-treatment device may be any devices capable of performing ion removal treatment from the EDI-treated water, removal treatment of dissolved gas, removal treatment of TOC component, and the like, and there is no particular limitation, and examples thereof include a regenerative ion exchange device, a non-regenerative ion exchange device, a degassing device, a UV oxidation device, and a membrane filtration device.

The post-treatment devices may be between the RO system and the EDI system, or may be intermediate the first reverse osmosis membrane device and the second reverse osmosis membrane device. In other words, the treated water of the first reverse osmosis membrane device or the treated water of the second reverse osmosis membrane device may be improved in water quality by post-treatment and then passed through the system of the later stage. For example, by degassing the permeated water of the first reverse osmosis membrane device and then passing the water through the second reverse osmosis membrane device, it is possible to improve the blocking ratio of the ionic component, particularly the cationic component.

The water to be treated in the pure water apparatus used in the present invention is not particularly limited, but may include industrial water, groundwater, surface water, tap water, seawater, seawater-desalinating-treatment water desalinated by reverse osmosis or evaporation of seawater, sewage, sewage treated water, various wastewaters, for example, wastewater used in semiconductor manufacturing processes, and mixed water thereof. As the water component to be treated, it is preferable to satisfy any one or more of a conductivity of 10 to 1000 µS/cm, a TDS of 5 to 500 ppm, a boron concentration of 10 ppb to 10 ppm, and a urea concentration of 1 to 100 ppb.

The water to be treated is preferably that impurities are removed from the water to be treated by pretreatment before being introduced into the reverse osmosis membrane device. The pretreatment device may be any devices capable of removing at least one of a suspended substance, a TOC component, an oxidizing component, a microorganism, and an ion in the water to be treated, and there is no particular limitation, and examples thereof include a coagulation sedimentation device, a sand filtration device, a pressure floatation device, a membrane filtration device, a softening device, an activated carbon treatment device, and the like.

The water quality of the treated water (pure water) obtained in the present invention is not particularly limited, and examples thereof include those having a specific resistance of 17 MΩ·cm or more, a boron concentration of 50 ppt or less, a silica concentration of 100 ppt or less, and a TOC concentration of 5 ppb or less. Preferably, the boron concentration is 1 ppt or less, the silica concentration is 50 ppt or less, and the TOC concentration is 2 ppb or less.

Figure 2:
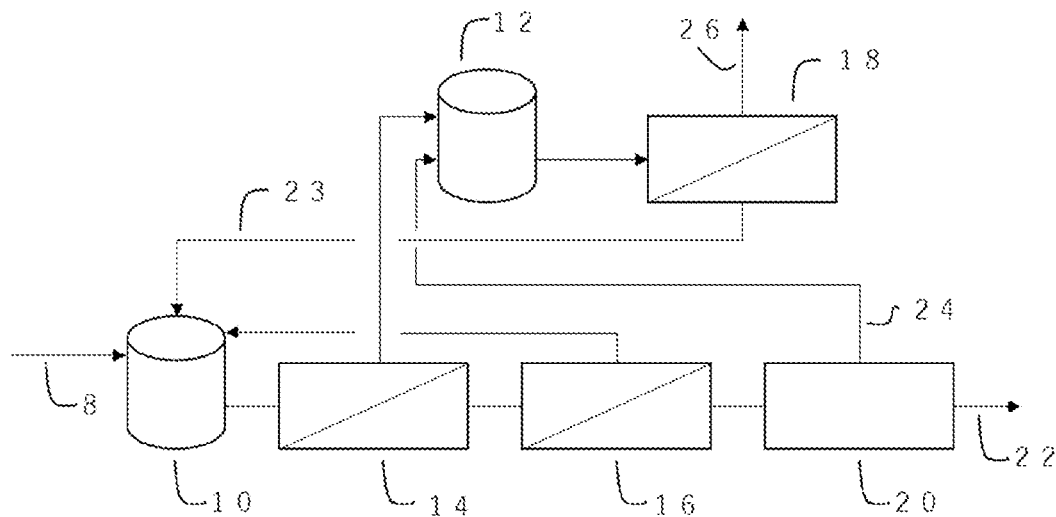
FIG. 2 A schematic diagram showing a configuration of a pure water production device according to another embodiment of the present invention.

Next, a second embodiment according to the present invention will be described with reference to FIG. 2. In FIG. 2, as compared with the first embodiment, the concentrated water from the second reverse osmosis membrane device 16 is collected not in the brine tank 12 but in the tank 10 of water to be treated. In this instance, although the impurity concentration in the tank of water to be treated is higher than that in the first embodiment, the concentrated water 24 from EDI 20 is still supplied to the brine tank 12, further processed by the third reverse osmosis membrane device 18, and the permeated water 23 is collected in the tank 10 of water to be treated, so that the impurity concentration in the water to be treated as a whole is kept low.

Figure 3:
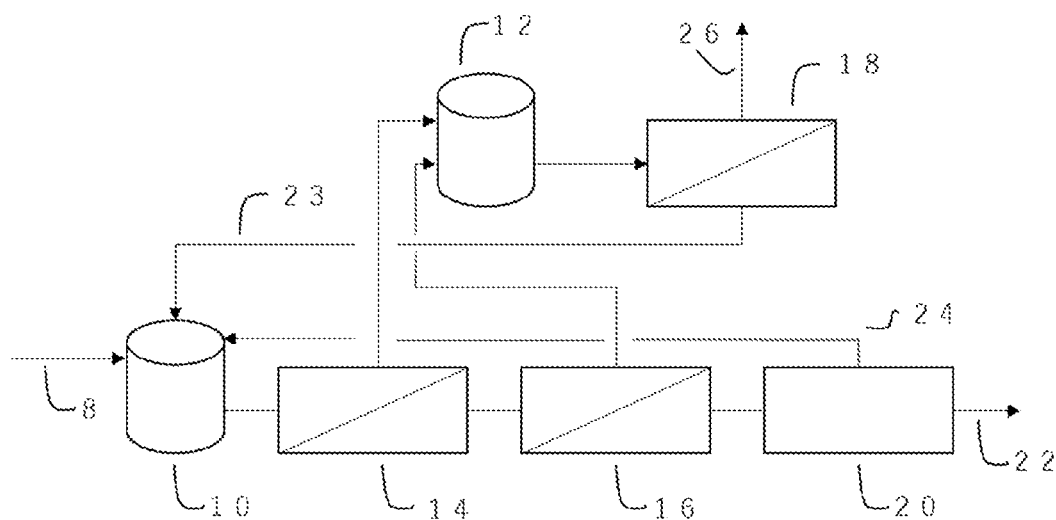
FIG. 3 A schematic diagram showing the configuration of a pure water production device according to another embodiment of the present invention.

Next, a third embodiment according to the present invention will be described with reference to FIG. 3. In FIG. 3, as compared with the first embodiment, the concentrated water 24 from EDI 20 is collected not in the brine tank 12 but in the tank 10 of water to be treated. In this case, similarly to the second embodiment, the impurity concentration in the tank of water to be treated is higher than that in the first embodiment, but the concentrated water from the second reverse osmosis membrane device 16 is still supplied to the brine tank 12, further processed by the third reverse osmosis membrane device 18, and the permeated water 23 is collected in the tank 10 of water to be treated, so that the impurity concentration in the water to be treated as a whole is kept low.

Figure 4:
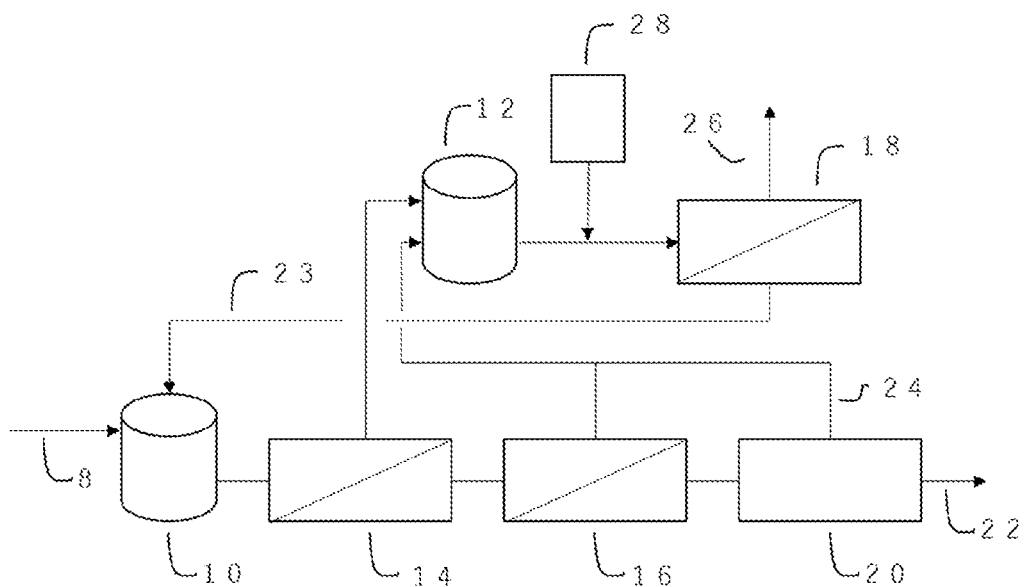
FIG. 4 A schematic diagram showing a configuration of a pure water production device according to yet another embodiment of the present invention.

Next, a fourth embodiment according to the present invention will be described with reference to FIG. 4. In FIG. 4, in addition to the first embodiment, a pH adjusting device 28 is provided at upstream of the third reverse osmosis membrane device (in FIG. 4, between the brine tank 12 and the third reverse osmosis membrane device 18). Thus, the pH of water supplied to the third reverse osmosis membrane device 18 can be adjusted. The value of the pH to be adjusted can be appropriately determined depending on the situation, and examples thereof include pH<6.0. Since a large amount of calcium or silica is contained in the water of the brine tank, it is possible to suppress the generation of scale derived from these by setting the pH in the range of this pH.

As the pH adjusting agent used here, there is no particular limitation as long as it has a function of adjusting the pH, and for example, hydrochloric acid, sulfuric acid, nitric acid, or the like can be used.

Figure 5:
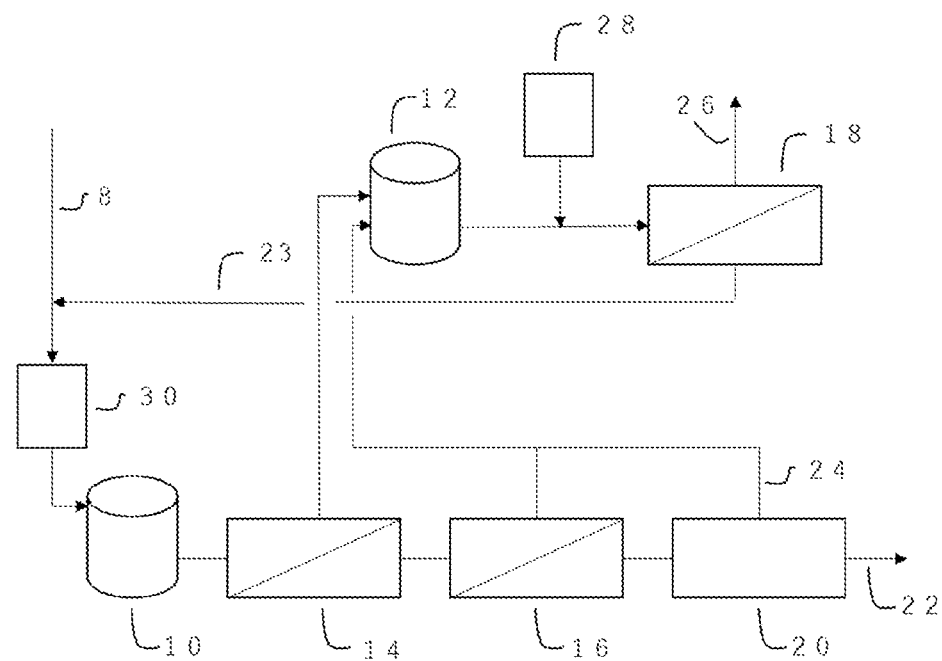
FIG. 5 A schematic diagram showing a configuration of a pure water production device according to another embodiment of the present invention.

Next, a fifth embodiment according to the present invention will be described with reference to FIG. 5. In FIG. 5, in addition to the fourth embodiment, a decarbonation device 30 is provided at upstream of the first reverse osmosis membrane 14 (the tank 10 of water to be treated). To the decarbonation device 30, the water to be treated 8 is supplied and the permeated water 23 from the third reverse osmosis membrane device 18 is also supplied. As a result, pure water can be efficiently produced when $CO_2$ concentration in the water to be treated is high. At this time, since the pH of the permeated water 23 from the third reverse osmosis membrane device is lowered by the pH adjusting device 28, the pH of the water to be treated 8 is also lowered by mixing with the permeated water 23. Here, since it is known that decarbonation is more efficient as the pH is lower, pure water can be further efficiently produced by the action of the pH adjusting device 28. Further, since the carbonic acid component which was not removed by the decarbonation device is concentrated in the water supplied to the third reverse osmosis device, the carbonic acid concentration in the permeated water 23 of the third reverse osmosis device becomes higher than that in the water to be treated. By subjecting the permeated water to a decarbonation treatment and then merging it into the tank 10 of water to be treated, an effect of reducing the carbonic acid concentration of the entire system can be expected. As the decarbonation device, a decarbonation tower or a decarbonation membrane is used.

Figure 6:
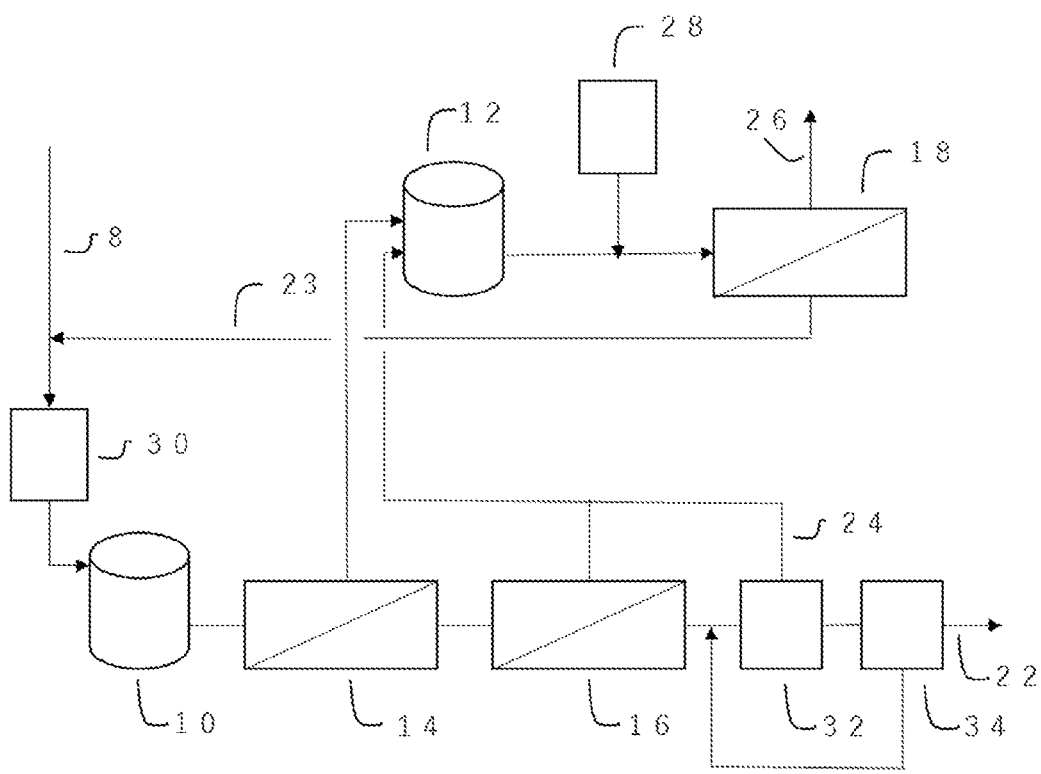
FIG. 6 A schematic view showing the configuration of a pure water production device according to another embodiment of the present invention.

Next, a sixth embodiment according to the present invention will be described with reference to FIG. 6. In FIG. 6, instead of EDI 20 of the fifth embodiment, a plurality of electrodeionization devices 32 and 34 are connected in series. Then, the concentrated water from a first stage electrodeionization device 32 directly connected to the second reverse osmosis membrane device is supplied to the brine tank 12, and the concentrated water from a second stage or later stage of electrodeionization device 34 is supplied between the second reverse osmosis membrane device 16 and the first stage electrodeionization device 32.

By making the EDI into a plurality of stages, pure water can be more efficiently produced. At this time, since the impurity concentration in the concentrated water from a second stage or later stage electrodeionization device is lower than the impurity concentration in the supplied water in a first stage EDI, it is not necessary to supply the concentrated water to the brine tank.

The embodiments concerning the present invention mentioned above show an example, and the present invention is not limited to the above-mentioned embodiments.

EXAMPLES

Hereinafter, the present invention will be described in further detail using Examples, but the present invention is not limited to the following Examples.

As the water to be treated used in the examples and comparative examples, the following were used.

With respect to 20 m³/h of water to be treated, 20 ppm of sodium, 20 ppm of calcium, 30 ppmCaCO₃ of bicarbonate ions, 10 ppm of ionic silica, 50 ppb of boron, and 20 ppb of urea, respectively, were operated for about 50 hours.

Further, as a pure-water production device, those provided with the following reverse osmosis membrane device and EDI were used, and the pH at the time of operation was as follows.

First Reverse Osmosis Membrane Device: Reverse Osmosis Membrane (trade name: CPA5-LD, manufactured by HYDRANAUTICS Corporation), recovery rate 80%, pH=8.0

Second Reverse Osmosis Membrane Device: Reverse Osmosis Membrane (trade name: SW30HRLE-440, manufactured by Dow Chemical Corporation), recovery rate 90%, pH=8.5

Third Reverse Osmosis Membrane Device: Reverse Osmosis Membrane (trade name: SWC5-LD, manufactured by HYDRANAUTICS Corporation), recovery rate 75%, pH=6

Electrodeionization: (trade name: EDI-XP, manufactured by ORGANO CORPORATION), recovery rate: 90%. The operating current was set to 5 A.

Comparative Example 11

Figure 7:
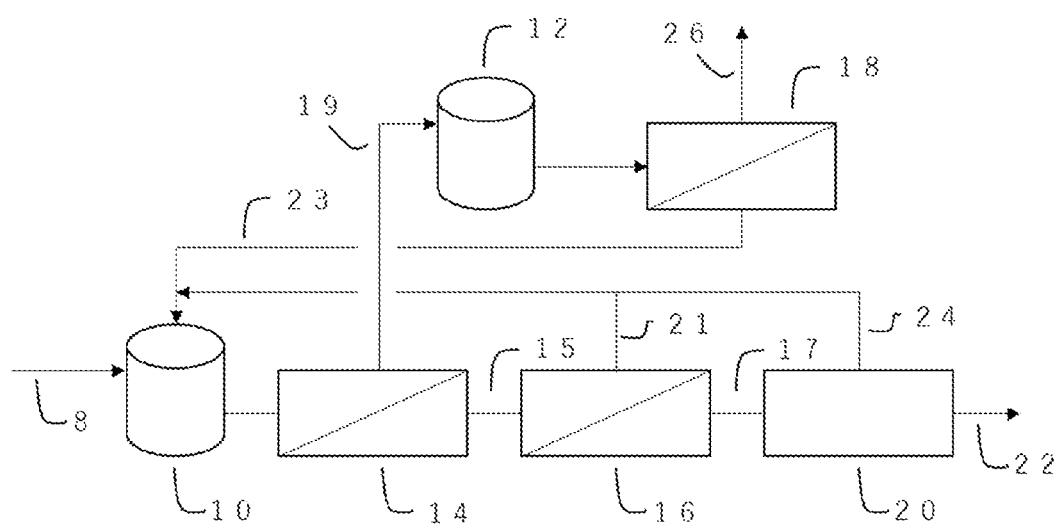
FIG. 7 A schematic view showing the configuration of the pure water production device used in the comparative example.

The operation was performed using the pure water production device shown in FIG. 7, and the concentrations of boron and urea were measured for the water in the tank of water to be treated and the permeated water from the second reverse osmosis membrane device. The results are given in Table 1.

TABLE 1

|  | Tank of water to be treated | Permeated water from the second reverse osmosis membrane device |
|---|---|---|
| Boron (ppb) | 65.9 | 8.1 |
| Urea (ppb) | 29.3 | 12.1 |

Working Example 1

The operation was performed using the pure-water production device of the first embodiment according to the present invention shown in FIG. 1, and the concentrations of boron and urea were measured for the water in the tank of water to be treated and the permeated water from the second reverse osmosis membrane device. The results are given in Table 2.

TABLE 2

|  | Tank of water to be treated | Permeated water from the second reverse osmosis membrane device |
|---|---|---|
| Boron (ppb) | 44.8 | 5.5 |
| Urea (ppb) | 20.0 | 8.1 |

In Comparative Example 1, since the concentrated water from the second reverse osmosis membrane device having a high concentration of boron and a high concentration of urea and the concentrated water from the EDI were returned to the water to be treated and recovered, the impurity concentration in the tank of water to be treated increased, and accordingly, the impurity concentration of the permeated water from the second reverse osmosis membrane device also increased.

On the other hand, in Working Example 1, concentrated water from the second reverse osmosis membrane device and concentrated water from EDI are supplied to the brine tank, and the permeated water of the third reverse osmosis membrane device is supplied to the tank of water to be treated. As a result, an increase in the concentration of impurities in the tank of water to be treated was suppressed, and the water quality was improved.

Working Examples 2 to 5, Comparative Example 2

Pure water was produced using the pure water production devices (Working Examples 2 to 5) of the present invention shown in FIGS. 1 and 4 to 6 and the pure water production device (Comparative Example 2) shown in FIG. 7, and the water quality of the finally obtained treated water 22 (pure water) was evaluated.

As a result, Working Examples 2 to 5, in any of Comparative Example 2, the specific resistance was greater than 18 MΩ·cm.

In addition, the boron concentration was less than 50 ppt in all of Working Examples 2 to 5, whereas it exceeded 50 ppt in Comparative Example 2

The urea concentration was less than 10 ppb in all of Working Examples 2 to 5, whereas it was greater than 12 ppb in Comparative Example 2

DESCRIPTION OF SYMBOLS

8 Water to be treated
10 Tank of water to be treated
12 Brine tank
14 First reverse osmosis membrane device
15 Permeated water from the first reverse osmosis membrane device
16 Second reverse osmosis membrane device
17 Permeated water from the second reverse osmosis membrane device
18 Third reverse osmosis membrane device
19 Concentrated water from the first reverse osmosis membrane device
20 Electrodeionization device (EDI)
21 Concentrated water from the second reverse osmosis membrane device
22 Treated water 23 Permeated water from the third reverse osmosis membrane device
24 Concentrated water from the electrodeionization device
26 Blow
28 pH adjusting device
30 Decarbonation device
32 the first stage EDI
34 the second stage EDI

The invention claimed is:

1. A pure-water production method comprising:
(a) supplying water to be treated to a first reverse osmosis membrane device,
(b) supplying permeated water from the first reverse osmosis membrane device to a second reverse osmosis membrane device,
(c) supplying permeated water from the second reverse osmosis membrane device to an electrodeionization device,
(d) supplying concentrated water from the first reverse osmosis membrane device to a brine tank,
(e) supplying to the brine tank at least one concentrated water selected from the group consisting of concentrated water from the second reverse osmosis membrane device and concentrated water from the electrodeionization device,
(f) supplying the concentrated water in the brine tank to a third reverse osmosis membrane device, wherein a pH adjusting agent is added to the concentrated water supplied from the brine tank at a location between the brine tank and the third reverse osmosis membrane device in an amount effective to adjust a pH of the concentrated water supplied from the brine tank to a value of less than 6.0,
(g) supplying permeated water from the third reverse osmosis membrane device to the water to be treated,
(h) taking out treated water from the electrodeionization device as pure water, wherein
the second reverse osmosis membrane device is a high-pressure reverse osmosis membrane device.

2. The pure-water production method according to claim 1, wherein the third reverse osmosis membrane device is a high-pressure type reverse osmosis membrane device.

3. The pure-water production method according to claim 1, further comprising supplying water to be treated and permeated water from the third reverse osmosis membrane device to a decarbonation device provided at upstream of the first reverse osmosis membrane device.

4. The pure-water production method according to claim 1, wherein the electrodeionization device is composed of plural stages of electrodeionization devices connected in series, and supplies concentrated water from a first stage electrodeionization device directly connected to the second reverse osmosis membrane device to the brine tank, concentrated water from a second stage or later stage electrodeionization device, wherein the method further comprises supplying the concentrated water between the second reverse osmosis membrane device and the first stage electrodeionization device.

5. The pure-water production method according to claim 1, wherein the pH adjusting agent is hydrochloric acid, sulfuric acid, or nitric acid.

6. The pure-water production method according to claim 1, wherein the pH adjusting agent is nitric acid.

7. The pure-water production method according to claim 1, wherein the pH adjusting agent is sulfuric acid.

* * * * *